United States Patent Office 3,277,164
Patented Oct. 4, 1966

3,277,164
SALICYLIC ACID DERIVATIVES
Erich Haack, Heidelberg, Rudi Gall and Ruth Heerdt, Mannheim, Johann Daniel Achelis, Heidelberg, and Felix H. Schmidt, Mannheim-Neuostheim, Germany, assignors to C. F. Boehringer & Soehne, G.m.b.H., Mannheim-Waldhof, Germany, a corporation of Germany
No Drawing. Filed Mar. 7, 1963, Ser. No. 263,415
Claims priority, application Germany, Mar. 21, 1962, B 66,450; Dec. 13, 1962, B 69,969
4 Claims. (Cl. 260—520)

This invention relates to a new group of chemical compounds which possess important therapeutic properties and to processes for their manufacture. More particularly, this invention relates to compounds of the formula

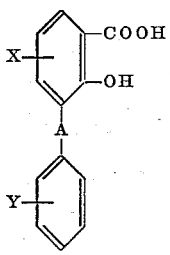

wherein X and Y represent hydrogen, halogen, hydroxyl, lower alkyl or alkoxyl radicals, and A represents an alkylene radical of from 2 to 4 carbon atoms, and wherein the salicylic acid carries an aralkyl radical substituent in the 3-position.

Typical examples of the group represented by X and Y are chlorine, bromine, fluorine, iodine, methyl, ethyl, propyl, hydroxy ethyl, hydroxy propyl, etc. Representative of A are such groups as ethylene, propylene, isopropylene, butylene, 1,2 - propylene, tetramethylene, branched chain hydrocarbon groups of the empirical formula $$C_nH_{2n}$$

wherein $n$ is a small positive integer amounting to 2 to 4, and the like.

It has been found that the compounds of the general formula possess a potent effect on carbohydrate metabolism which manifests itself in their ability to lower the normal blood sugar level, and particularly to lower pathologically elevated blood sugar levels.

An effect which is similar in principle is also produced by salicylic acid and certain of its substitution products (J. Pharm. and Pharmacol., 11, 1959, p. 705; Biochem. J. 75, 1960, p. 298). The effect of the new compounds, however, is far beyond what one would be led to expect from the teachings of the prior art. The blood sugar reducing effect of the compounds of the invention is approximately 5–10 fold and more, than that of the known compounds. At the same time, the acute toxicity is only slightly higher than that of salicylic acid itself. The new compounds thus are particularly useful, especially in the treatment of diabetic conditions, for which purpose they may be used either alone or in combination with other substances having a similar effect on carbohydrate metabolism, i.e., control of blood sugar.

The compounds are preferably administered in the form of tablets or elixirs in conjunction with suitable carriers and other types of pharmaceutical dosage units.

The compounds of the invention may be prepared by a number of alternate but equivalent reactions based on the methods used for the production fo substituted salicylic acids. A preferred procedure consists in contacting with carbon dioxide a substituted phenol of the formula

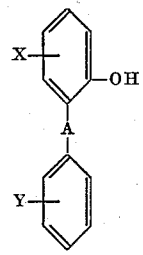

or an alkali salt thereof wherein X, Y, and A have the meanings hereinbefore assigned. The carboxylation is performed preferably under the same conditions as the Kolbe-Schmitt synthesis or one of the known variations of this procedure (Chem. Reviews 57, 1957, p. 583). In place of the free phenols, o-metalized derivatives can be subjected to the carboxylation.

An alternate method for introducing the carboxyl group into the o-position with respect to the phenolic hydroxyl group comprises treating with an oxidant a substituted phenol of the formula:

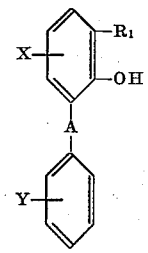

wherein X, Y, and A have the meanings hereinbefore assigned and $R_1$ is lower alkyl, a primary or secondary alcohol group —$CH_2OH$ or —$CH(R)$—$OH$, an aldehyde group or keto group —CHO or —CO—R, or a primary, secondary or tertiary aminomethylene group —$CH_2NRR$.

The carboxyl group may also be introduced by treating with a saponifying agent a substituted phenol of the formula

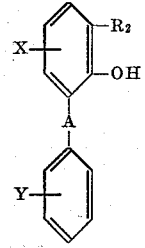

wherein X, Y, and A have the meanings hereinbefore assigned and $R_3$ is selected from among the carbonic ester group —COOR, the carbonic acid amide group —CO—NRR, the nitrile group —CN or a trichlormethyl group —$CCl_3$.

The compounds of the invention may also be produced by treating a benzoic acid derivative of the formula

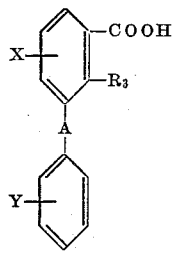

wherein X, Y, and A have the meanings above assigned and $R_3$ is an ether or an ester of an hydroxy group which can be converted into the hydroxyl group as for example by saponification (esterified hydroxyl group) or by one of the ether cleavage procedures as for instance treatment with hydrogen halide or hydrogenation (etherified hydroxyl group) or other functional groups which can be converted into the hydroxyl group, as for example an amino group (through the diazonium group and its destruction by boiling according to Sandmeyer's method).

Lastly, the new compounds can also be prepared by aralkylating a salicylic acid of the formula

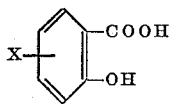

or a functional derivative thereof, as for example an ester in the third position be reaction thereof with an aralkyl compound of the formula

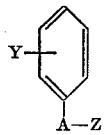

wherein X, Y, and A are as above defined and Z represents the anionic portion of an inorganic or strong organic acid, as for example chloride, bromide, iodide, sulfonate, or the like, or with the aralkene corresponding thereto.

The aralkyl radical can also be introduced into the 3-position by reducing the alcoholic hydroxyl group or the keto group in salicylic acid derivatives of the formula

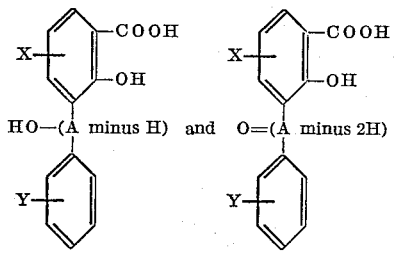

respectively.

In the above reaction sequence, it is preferably and sometimes necessary to block off the p-position in relation to the OH group temporarily by means of a group that can easily be split off after the reaction is completed. It is possible to use for this purpose a halogen, nitro or amino group which can subsequently be removed by a reduction reaction for example. Another possibility is to block the p-position with a tert-butyl radical which can then be split off with aluminum chloride.

In the above general Formula A is a bivalent hydrocarbon radical of from 2 to 4 carbon atoms and can be saturated or unsaturated. The preparation of the unsaturated aralkyl-salicylic acid where A is an unsaturated straight-chain or branched chain alkylene radical is carried out by similar methods to those used to prepare saturated compounds but those methods are preferred in which the unsaturated aralkyl group is not likely to be adversely affected.

The unsaturated aralkyl-salicylic acids are useful per se because of their valuable pharmaceutical properties in reducing blood sugar. However, they also represent important intermediates for use in the manufacture of the compounds of the above general formula in which A represents a saturated alkylene residue, since they can be transformed simply by hydrogenation into the corresponding saturated aralkyl-salicylic acids.

The compounds of the invention are all of great therapeutic value particularly in the treatment of diabetes. The products wherein—

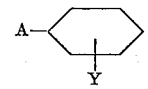

is phenyl ethyl, or phenyl propyl and particularly the compounds 3-(α-phenyl ethyl)-salicylic acids, 3-(β-phenyl ethyl)-salicylic acid, and 3-(γ-phenyl-propyl)-salicylic acid possess the highest degree of activity in this respect, and hence constitute preferred sub-groups of the products.

The compounds wherein

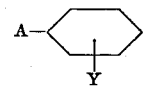

is phenyl ethylene, vinyl benzyl, methyl-phenylethylene Y, phenyl ethyl-methyl, and dimethyl benzene are also extremely useful as medicinal agents and namely in the treatment of diabetes, although not possessed of the extremely high degree of activity of the first mentioned sub-group and constitute a second preferred sub-group of products.

The effectiveness of the compounds of the invention was determined in experimental procedures using as test subjects rabbits. Salicylic acid and 3-(phenyl)-salicylic acids were used for purposes of comparison.

The criterion of the relative salicylate effect was the following: a compound is more highly active than salicylic acid if a dose substantially smaller than 125 mg./kg. per os potentiates the hypoglycemia induced by $N_1$-sulfanilyl-$N_2$(n-butyl)urea. For example, in the case of 3-(α-phenyl ethyl)-salicylic acid, 25–50 kg./kg. per os suffice and 50 mg./kg. per os suffice in the case of 3-(β-phenyl ethyl)-salicylic acid and 3-(γ-phenyl-propyl)-salicylic acid while in the case of various of the other compounds 75 mg./kg. per os had to be administered. 125 mg./kg. had to be administered in the case of salicylic acid and 3-phenyl salicylic acid.

The results of the experimental procedures are shown in the following table:

| No. | Chemical Name | Mouse LD–50 s.c., g./kg. | Rel. Salicylate Effect |
|---|---|---|---|
| 1 | 3-(α-phenylethyl)-salicylic acid | 0.212 | ++++ |
| 2 | 3-(β-phenylethyl)-salicylic acid | 0.202 | +++ |
| 3 | 3-(γ-phenyl-propyl)-salicylic acid | | +++ |
| 4 | 3-(β-phenethylene)-salicylic acid | 0.275 | ++(+) |
| 5 | 3-(α-vinylbenzyl)-salicylic acid | 0.425 | ++(+) |
| 6 | 3-(α-methyl-β-phenethylene)-salicylic acid | | ++(+) |
| 7 | 3-(β-phenylethyl-α-methyl)-salicylic acid | 0.29 | ++(+) |
| 8 | 3-(α,α-dimethyl-benzyl)-salicylic acid | 0.375 | ++(+) |
| 9 | Salicylic acid | 0.52 | ++ |
| 10 | 3-(phenyl)-salicylic acid | 0.245 | ++ |

The invention is further illustrated in detail by the following examples which are not to be constructed as limiting it in spirit or in scope.

*Example 1.—3-(α-methyl-benzyl)-salicylic acid*

8.8 g. of sodium in small pieces are added over a period of 2 hours to 38 g. of 2-(α-methyl-benzyl)-phenol in solution in 500 cc. of xylene under reflux and while carbon dioxide is continuously passed through the solution. The heating of the mixture is continued for another 4 hours with carbon dioxide being passed therethrough. After cooling, the untreated sodium is dissolved out with alcohol and the solution is evaporated in vacuo. The residue is taken up in water, acidified and extracted with ether. The acid present in the ethereal solution is neutralized with soda solution and the unreacted phenol remaining in the ether is recovered. Thereafter the soda solution is made acid, extracted with ether, and the ether extract dried and evaporated. 29.5 grams (63.6% of theory) of 3-(α-methyl-benzyl)-salicylic acid having a melting point of 132–134° C. are recovered as a residue. It forms a crystalline product which melts at 136–138° C. after recrystallization from a 5:1 mixture of benzene and ligroin or from a 50% aqueous solution of alcohol.

The following compounds are obtained in an analogous manner:

3-(α,α-dimethyl-benzyl)-salicylic acid—M.P. 199–200° C.

3-(α-methyl-2'-methylbenzyl)-salicylic acid—M.P. 186–187° C.

3-(β-phenyl-ethyl)-salicylic acid—M.P. 145–147° C.

3-(α-ethyl-benzyl)-salicylic acid—M.P. 114–116° C.

*Example 2.—3-(α-methyl-2'-methoxybenzyl)-salicylic acid*

12.2 grams of 2-(α-methyl-2'-methoxybenzyl)-phenol-sodium salt are dissolved in 35 cc. of diethyleneglycol-dimethyl-ether and the resulting solution heated in a 200 cc. autoclave for 10 hours at 200° C. under 105 atmospheres of carbon dioxide. The concentration and purification are carried out as set out in Example 1 above. 3-(α-methyl-2'-methoxybenzyl)-salicylic acid, having a melting point of 176° C. is recovered in a yield amounting to 60% of theory.

*Example 3.—3-(α-methyl-4'-chlorbenzyl)-salicylic acid*

27 g. of 2-(α-methyl-4'-chlorbenzyl)-phenol (B.P.$_{0.2}$ 159–160° C.) are added to a solution of 2.77 g. of sodium dissolved in 50 cc. of absolute methanol. The methanol is evaporated off in vacuo. The residue is twice taken up in 20 cc. absolute xylene and the xylene solution concentrated in vacuo. 30 cc. of xylene are added to the residue and the xylene is removed by distillation carried out with the introduction of nitrogen. Following the addition of a further 100 cc. of xylene to the residue, dry carbon dioxide is introduced at 130–140° C. with stirring for 9 hours. The concentration and purification are carried out as set out in Example 1 above. There are obtained 15.6 g. of 3-(α-methyl-4'-chlorbenzyl)-salicylic acid having a melting point of 189° C.

*Example 4.—3-(α-methyl-benzyl)-salicylic acid— by oxidation of a saligenin derivative*

(a) *3-(α-methyl-benzyl)-5-chloro-saligenin.*—A mixture of 23.3 grams of 2-(α-methyl-benzyl)-4-chlorophenol (J. Amer. Soc. 76, 1954, p. 4547), 4 g. of sodium hydroxide in a 10% solution and 15 g. of 40% formation solution are stirred for 12 hours at 40° C. The mixture is then acidified and extracted with ether. The extract is washed with soda solution until neutral and then with water, and is dried and concentrated. 26 g. (99% of theory) of a yellowish oil remain which are established by paper chromatography to be a homogeneous product free of initial starting compound.

(b) *3-(α-methyl-benzyl)-saligenin.*—15.5 g. of the product obtained described in 4a above are dissolved in 350 ml. of methanol and 62 ml. of normal caustic soda solution are added thereto. Following the addition of an aqueous suspension of 10% palladium supported on carbon, the solution is hydrogenated under normal pressure. The solution recovered is filtered free of catalyst and is concentrated and acidified. The residue is extracted with methylene chloride and is washed until neutral, dried and concentrated. On the addition of ligroin, 8.7 grams of a crystalline product (65% of theory) are obtained. The crystalline product is purified by recrystallization from a mixture of methylene chloride and ligroin. The white crystals obtained melt at 64–66° C. (FeCl$_3$ reaction in CH$_3$OH: blue).

The acid obtained according to Example 1 can be reduced with lithium aluminum hydride to a saligenin derivative which, when combined with the above product, does not act to lower its melting point.

(c) *2-methoxy-3-(α-methyl-benzyl)-benzyl alcohol.*—5 g. of 3-(α-methyl-benzyl)saligenin are dissolved in 50 ml. of methanol and 1.8 g. of sodium methylate and 5 ml. of methyl iodide are added to the solution. The solution is heated for 4 hours under reflux. An additional 5 ml. of methyl iodide are introduced and the mixture is heated for another 3 hours. The solution is then concentrated, the concentrate is taken up in water and is extracted with benzene. The benzene extract is, in turn, extracted by shaking with Claisen's solution until the latter is colorless, so as to remove any non-etherified starting material, and it is then washed until neutral with water, dried and concentrated. The concentrate thus obtained (4.3 g., 81% of theory) is an oily product which, on paper chromatographic analysis is proven to be homogeneous. The FeCl$_3$ reaction is negative.

(d) *2-methoxy-3-(α-methyl-benzyl)benzoic acid.*—2 grams of the alcohol prepared according to the procedure of Example 4c are diluted with 40 ml. of normal caustic soda solution. 58 ml. of a 3% potassium permanganate solution are added drop-wise with stirring at 50° C. The stirring is continued for 1 hour after which some alcohol is added and the solution freed of manganese dioxide. The clear solution which remains is acidified and extracted with ether. The ether solution is washed until neutral, dried and concentrated by evaporation to a residue. The residue consists of 1.4 grams (66% of theory) of a yellowish oil, namely 2-methoxy-3-(α-methyl-benzyl)-benzoic acid which is directly demethylated.

(e) *3-(α-methyl-benzyl)-salicylic acid.*—1.4 grams of 2-methoxy-3-(α-methyl-benzyl)-benzoic acid, together with 50 ml. of 48% hydrobromic acid is refluxed for one hour. The mixture is then vacuum concentrated and the concentrate taken up in 2 N soda solution and extracted with benzene. The aqueous solution is neutralized, carbon is added, and the solution is filtered while hot. As a grease-like product is obtained upon acidification, the product is again dissolved in ether and washed several times with water. Ether extract is dried, following which the ether is evaporated off. One gram (76% of theory) of an oil remains which crystallizes immediately upon the addition of ligroin. Following recrystallization from benzene-legroin, the compound 3-(α-methyl-benzyl)-salicylic acid melts at 136–138° C. Paper chromatographic analysis establishes the compound of this example to be identical with the compound prepared in Example 1. No depression of the melting point results when the two compounds are mixed together.

*Example 5.—3-(α-methyl-benzyl)-salicylic acid by oxidation of a salicylic aldehyde derivative*

(I) WITH INTERMEDIATE BLOCKING OF THE PARA POSITION (a) *3-(α-methyl-benzyl)-5-chloro-salicylaldehyde.*—The saligenin derivative obtained from 55 grams of 2-(α-methyl-benzyl)-4-chloro-phenol according to the procedure of Example 4a above is dissolved in 475 grams of a 10% aqueous solution of caustic soda and, after the addition of 58.5 grams of m-nitrobenzene-sulfo acid sodium, is heated under reflux for 4 hours (J. Pr. Ch. 158, 254/1941). The resulting dark solution is then cooled, adjusted to a pH of 6 with dilute hydrochloric acid and extracted with ether. The ether solution is washed with water, dried, and concentrated. The concentrate obtained amounts to 34.3 g. (55.7% of theory) of 3-(α-methyl-benzyl)-5-chloro-salicylaldehyde, having a boiling point$_{0.4}$ of 160–163° C. and a melting point of 35–37° C. (recrystallized from methanol).

(b) *3 - (α-methyl-benzyl)-5-chloro-salicylic acid.*—20 grams of the aldehyde obtained in 5a above are dissolved in 157 ml. of a 10% aqueous solution of caustic soda, and a solution of 13.1 g. of silver nitrate in 30 ml. of water is added thereto at 50° C. (J. Org. Chem. 12, 85, 1947). The resulting suspension is stirred for 30 minutes at 50° C. and suction filtered. The residue which remains is washed thoroughly with water following which sulfur dioxide is passed through the filtrate. The viscous product which is precipitated is taken up in ether and after washing with water and drying, the solution is again concentrated. The crystalline concentrate thus obtained is recrystallized out of toluene-ligroin and yields 11.2 g. (53% of theory) of 3-(α-methyl-benzyl)-5-chloro-salicylic acid having a melting point of 157–158° C.

The corresponding bromo compound, namely 3-(α-methyl-benzyl)-5-bromo-salicylic acid having a melting point of 150–152° C. is obtained in a similar manner.

(c) *3-(α-methyl-benzyl)-salicylic acid.*—1.4 grams of 3-(α-methyl-benzyl)-5-chloro-salicylic acid are dissolved in 50 ml. methanol and hydrogenated at normal pressure in the presence of 1 gram of a 10% palladium-carbon catalyst. After the calculated amount of hydrogen has been absorbed, the catalyst is filtered out and the filtrate is evaporated to dryness. The concentrate (1.2 grams) is recrystallized from toluene. The pure substance obtained melts at 136–138° C. and produces no depression of the melting point when admixed with the compound made according to the procedure of Example 1 above.

(II) WITHOUT BLOCKING OF THE PARA POSITION (a) *3-(α-methyl-benzyl)-salicylaldehyde.*—The saligenin derivative prepared according to the procedure of Example 4b is oxidized to the aldehyde according to the method described above under 5–Ia. 3-(α-methyl-benzyl)-salicylic aldehyde having a B.P.$_{0.5}$ of 140–145° C. and a melting point of 30–33° C. is obtained in a yield of 23% of the theoretical.

(b) *3-(α-methyl-benzyl)-salicylic acid.*—The oxidation of the aldehyde is performed as described in Example 5–Ib. 3-(α-methyl-benzyl)-salicylic acid is obtained in a 93% yield. Following purification by recrystallization from toluene, the compound melts at 136–138° C. It is identical to the products of Examples 1 and 5c and evidences no depression of the melting point when admixed therewith and is characterized by the same Rf values in paper chromatographic analysis.

*Example 6*

From the method described in Example 1, the following compounds are obtained:

3-(γ-phenyl-propyl)-salicylic acid—M.P. 128–130° C.
3-(α-methyl-benzyl)-6-methyl-salicylic acid—M.P. 129–131° C.
3-(α-methyl-benzyl)-5-methyl-salicylic acid.—M.P. 160–161° C.
3-(α-methyl-m-methylbenzyl)-salicylic acid—M.P. 106–108° C.
3-(α-methyl-β-phenethyl)-salicylic acid—M.P. 125–127° C.
3-(β-o-hydroxy-phenethyl)-salicylic acid—M.P. 160–162° C.
3-(α-methyl-benzyl)-γ-resorcylic acid—M.P. 167° C.
3-(α-methyl-p-methylbenzyl)-salicylic acid—M.P. 160° C.

*Example 7*

Following the method heretofore described in Example 2 but using xylene as the solvent, 3-(α-methyl-o-fluorobenzyl)-salicylic acid having a melting point of 157–158° C. is obtained.

*Example 8*

The following compounds are obtained with the technique described in Example 3:

3-(α-methyl-m-chlorbenzyl)-salicylic acid—M.P. 95° C.
3-(β-o-chloro-phenethyl)-salicylic acid—M.P. 163° C.

*Example 9.—3-(α-vinyl-benzyl)-salicylic acid*

11 grams of sodium are melted in 400 ml. of dry xylene. 50 grams of 2-(α-phenyl-allyl)-phenol (prepared as described in B. 58, 1925, p. 275) in 100 ml. of xylene are introduced. Carbon dioxide is fed into the resulting solution for 9 hours with agitation under reflux. After cooling, alcohol is added and the solvent stripped off by distillation in vacuo. The residue is taken up in soda solution, and this solution is extracted repeatedly with ligroin. 12 grams of the unreacted phenol starting compound can be recovered from the ligroin extract. Animal charcoal is added to the aqueous solution and the resulting suspension heated. Sulfur dioxide is fed into the filtrate which is thereafter recovered. The precipitate which forms is suction filtered at room temperature, washed repeatedly with water and dried.

40.2 grams of 3-(α-vinyl-benzyl)-salicylic acid having a melting point of 119–122° C. are obtained. After recrystallization from benzene-ligroin, the compound melts at 124–125° C. The yield of pure product amounts to 28.2 g. (61% of theory, as a percentage of the amount of the phenol starting compound introduced into the reaction).

By the catalytic hydrogenation of 3-(α-vinyl-benzyl)-salicylic acid, in the presence of palladium-charcoal catalyst, 3-(α-ethyl-benzyl)-salicylic acid having a melting point of 114–116° C. as described in Example 1 is obtained in 93% yield.

*Example 10.—3-(β-styryl)-salicylic acid*

11.8 g. of o-oxystilbene (M.P. 145–146° C.; A. 433, 1923, page 240) are converted with molar amounts of sodium methylate (13.8 g. sodium in 40 ml. absolute methanol) to the sodium salt. Xylene is added to remove the methanol, and distillation continued until only pure xylene is recovered. Thereupon 4.2 grams of potassium carbonate are added to the xylene solution, and it is carboxylated for 7 hours in an autoclave at 130° C. under 56 atmospheres of carbon dioxide. The reaction mixture is then extracted with water, the extract is acidified and re-extracted with ether. The ether extract is shaken with dilute sodium bicarbonate solution, the solution thus obtained is acidified, and the precipitate which forms filtered off. After recrystallization from toluene, 4.9 grams of 3-(β-styryl)-salicylic acid having a melting point of 201–203° C., amounting to a yield of 34% of theory are obtained.

In an analogous manner, the following compounds are obtained:

3-(α-methyl-β-styryl)-salicylic acid—M.P. 155–158° C.

The o-(α-methyl-β-styryl)-phenol used as the starting material has a boiling point $_{0.1}$ of 123–129° C. The end product is purified via the sodium salt.

3-[β-(2'-chloro-styryl)]-salicylic acid having a M.P. 220–22° C.

The o-chloro-o'-oxy-stilbene used as starting material has a melting point of 133° C.

The end product is purified via the sodium salt.

3-(α-styryl)-salicylic acid having a melting point of 143–145° C.

The 2-(β-methylene-benzyl)-phenol used as the starting material is made according to the procedure described in B. 36, 1903, page 4002. The end reaction product is purified by recrystallization from benzene-ligroin.

Through the catalytic hydrogenation of the last-named compound, using palladium-charcoal as catalyst, a 96% yield of 3-(α-methyl-benzyl)-salicylic acid having a melting point of 136–138° C. and as described in Example 1 is obtained.

The compounds of the invention form alkali metal-, alkaline earth metal- and ammonium salts and especially potassium-, sodium- and magnesium salts as well as salts with various organic amines which are compatible with the human system. Such salts are prepared in the usual manner, for instance, by adding the metal or ammonium hydroxide to the salicylic acid derivative. It is also possible to produce salts with organic bases which are compatible with the human system in the amounts administered.

The salts set forth herein are useful in the treatment of diabetes in like manner as the acid compounds set forth herein, administered in the same dosage and in the time sequence as said compounds.

The compositions in accordance with the invention are supplied, for example, as tablets, containing 500 mg. of the active compound per tablet. For most patients, the recommended daily dosage is 1–3 g., that is 2–6 tablets.

We claim:
1. 3-(α-phenylethyl)-salicylic acid.
2. 3-(β-phenylethyl-α-methyl)-salicylic acid.
3. 3-(α,α-dimethyl-benzyl)-salicylic acid.
4. 3-(α-methyl-benzyl)-6-methyl-salicylic acid.

References Cited by the Examiner

UNITED STATES PATENTS

| | | | |
|---|---|---|---|
| 1,969,356 | 8/1934 | Christiansen et al. | 260—520 |
| 2,042,343 | 5/1936 | Kyrides | 260—520 |
| 2,807,643 | 9/1957 | Hartley | 260—520 |
| 2,961,377 | 11/1960 | Shapiro et al. | 167—65 |
| 3,116,324 | 12/1963 | Dolliver | 260—520 |
| 3,174,901 | 3/1965 | Sterne | 167—65 |

FOREIGN PATENTS 131,520    5/1929    Switzerland.

LORRAINE A. WEINBERGER, *Primary Examiner.*

S. B. WILLIAMS, *Assistant Examiner.*